(12) United States Patent
Buellesfeld et al.

(10) Patent No.: US 7,185,517 B2
(45) Date of Patent: Mar. 6, 2007

(54) DOUBLE CRUCIBLE FOR A GLASS DRAWING METHOD AND METHOD OF MAKING GLASS FIBER OR A PREFORM WITH THE DOUBLE CRUCIBLE

(75) Inventors: Frank Buellesfeld, Frankfurt (DE); Paul Kissl, Mainz (DE); Uwe Kolberg, Mainz (DE); Volker Ohmstede, Mainz (DE)

(73) Assignee: Schott AG, Mainz (DE)

( * ) Notice: Subject to any disclaimer, the term of this patent is extended or adjusted under 35 U.S.C. 154(b) by 215 days.

(21) Appl. No.: 10/614,449

(22) Filed: Jul. 7, 2003

(65) Prior Publication Data

US 2004/0060325 A1 Apr. 1, 2004

(30) Foreign Application Priority Data

Jul. 4, 2002 (DE) ................. 102 29 942

(51) Int. Cl.
  *C03B 37/07* (2006.01)
  *C03B 37/09* (2006.01)
  *C03B 37/075* (2006.01)
(52) U.S. Cl. ................ 65/488; 65/493; 65/495; 65/502; 65/509

(58) Field of Classification Search .......... 65/405, 65/502, 495, 493, 131.5, 133.1, 425, 384, 65/488, 509

See application file for complete search history.

(56) References Cited

U.S. PATENT DOCUMENTS

| 3,929,440 A | * | 12/1975 | Oldfield ................ 65/32.5 |
| 4,133,664 A | * | 1/1979 | Aulich et al. ............ 65/405 |
| 4,660,212 A | * | 4/1987 | Boen et al. ............ 373/156 |
| 5,106,400 A | * | 4/1992 | Tick ..................... 65/388 |

FOREIGN PATENT DOCUMENTS

| DE | 26 29 658 | | 1/1978 |
| EP | 109131 A | * | 5/1984 |

* cited by examiner

*Primary Examiner*—Sean Vincent
(74) *Attorney, Agent, or Firm*—Michael J. Striker (57) ABSTRACT

The double crucible for a glass drawing method has a heatable outer crucible (1) and an inner crucible (2) surrounded by the outer crucible (1), which is heatable separately from the outer crucible (1). Both crucibles (1,2) have an outlet nozzle (1a, 2a) for the glass to be drawn. To make glass fibers from heavy metal oxide glass (HMO-glass) with higher quality and comparatively simple crucible features, the outlet nozzle (1a) of the outer crucible (1) extends a certain distance beyond the outlet nozzle (2a) of the inner crucible (2). Surfaces of the outlet nozzles coming in contact with the glass melt are polished and are provided on a material, which has a reducing action on heavy metal glass in the melt in all cases. These surfaces also have sufficient mechanical strength for and chemical inertness to heavy metal oxide glass.

15 Claims, 5 Drawing Sheets

DOUBLE CRUCIBLE FOR A GLASS DRAWING METHOD AND METHOD OF MAKING GLASS FIBER OR A PREFORM WITH THE DOUBLE CRUCIBLE

BACKGROUND OF THE INVENTION

1. Field of the Invention

The present invention relates to a double crucible for a glass drawing method with a heated outer crucible and an inner crucible surrounding the outer crucible. The inner crucible is formed so that it is heatable separately from the outer crucible. Both inner and outer crucibles have outlet nozzles for the glass to be drawn. The present invention also relates to a method of making glass fiber or a preform of the glass fiber with the double crucible.

2. Description of the Related Art

Core-clad glass fibers, i.e. glass fibers, which have an inner core comprising a first glass and at least one outer coating or cladding comprising a second glass, are typically drawn from a coaxial double crucible. The cladding or coating glass is located in the outer crucible and the core glass is located in the inner crucible.

In the known manufacturing methods typically double crucibles with heatable outer crucibles are used.

However if a glass fiber is made using a glass pair, whose coating glass located in the outer crucible has a lower viscosity than the core glass in the inner crucible, then control of the drawing process has proven to be difficult or impossible. In order to obtain a predetermined viscosity of the core glass, the outer crucible must be heated so that the viscosity of the coating glass would be too small.

Furthermore poor heat conduction and/or poor transparency during radiant heating of the glass in the outer crucible can make a sufficiently thorough heating of the contents of the inner crucible difficult.

A known double crucible with a heated outer crucible and an inner crucible surrounded by the outer crucible, in which the inner crucible is heated separately from the outer crucible, is described in DE 26 29 658 A. The core glass in the inner crucible may be brought to a higher temperature independently of heating the coating glass in the outer crucible. Thus a lower viscosity of the core glass may be adjusted to the viscosity of the coating glass.

SUMMARY OF THE INVENTION

It is an object of the present invention to provide a double crucible of the above-described kind for a glass drawing process and/or a method of the above-described kind for making a glass fiber or a preform of it, so that the glass fiber, especially made from heavy metal oxide glass, the so-called HMO glass, is made with a higher quality and has comparatively simple features. HMO glass according to the invention is a glass containing one or more oxides of Bi, Sb, Te, Pb, As, Se, Cd and/or Ga.

According to the present invention this object is attained in a double crucible for the glass drawing process with a heated outer crucible and an inner crucible surrounded by the outer crucible, which is heated separately from the outer crucible and in which outlet nozzles are provided in both inner and outer crucibles for the glass to be drawn.

According to the invention the double crucible is formed so that the outlet nozzle of the inner crucible projects a certain amount beyond the outlet nozzle for the outer crucible. Surfaces of the outlet nozzles coming in contact with the glass melt may be polished, are preferably provided on a material that has a reducing action on heavy metal oxide glass in the glass melt and have sufficient mechanical strength and chemical inertness to the heavy metal oxide glass.

The outlet nozzle of the inner crucible projecting beyond the outlet nozzle of the outer crucible advantageously stabilizes glass with a steep viscosity curve.

Glass with a steep viscosity curve means that the viscosity of the glass decreases within a small temperature range, $\Delta T$, from a viscosity of $10^3$ to a viscosity of $10^{7.6}$. According to the invention, glass having a steep viscosity curve is e.g. a glass wherein the temperature range, $\Delta T$, is at most 150° C., preferably at most 120° C.

For manufacture of a preform for glass fiber it is advantageous if a preform with a large diameter can be drawn from the double crucible. The larger the diameter of the preform, the more efficient is the actual fiber drawing process, since a longer fiber can be drawn from one preform. However, if glass having a steep viscosity curve and/or glass having a high density is drawn into preforms for glass fiber, the manufacture of the preforms having a large diameter is difficult.

In case a glass has a steep viscosity curve, the drawing process must be conducted by a comparatively low viscosity to ensure drawability of the glass. However, if the glass flowing out of the crucible has comparatively low viscosity, it is drawn in to a longer and thinner preform by force of gravity than a glass having a higher viscosity.

The same holds true if a glass of a higher density is drawn into a preform. Glass having a high density is e.g. glass having a density of at least 4.0 g/cm³, preferably at least 4.5 g/cm³ and more preferably at least 5.0 g/cm³.

The present invention is particularly advantageous for manufacture of preforms of glass having a steep viscosity curve and a high density. For example, the bismuth oxide glass of the examples has a density of 6.5 g/cm³ and a temperature range, $\Delta T$, as described above of only 88° C.

It has now been found that glass having a steep viscosity curve and/or a high density can be drawn into preforms having a large diameter, if a double crucible according to the invention is used. The outlet nozzle of the inner crucible projecting beyond the outlet nozzle of the outer crucible theoretically has two positive effects. It stabilizes the glass flowing out of the outlet nozzle of the outer crucible for a short time during which the glass cools down by contact with the surrounding air and thus the viscosity decreases. Additionally, the glass of the cladding is slowed down by contact with the outlet nozzle of the inner crucible.

The length of the projection of the outlet nozzle of the inner crucible depends on the diameter $D_A$ of the outlet nozzle of the outer crucible. The larger the diameter of the outlet nozzle of the outer crucible, the longer the projection of the outlet nozzle of the inner crucible should be in order to ensure the benefits and effects of the present invention. Preferably, the outlet nozzle of the inner crucible projects by a length $\Delta L$ of at least ⅓, more preferably by at least ½ and most preferably by at most ⅔, of the diameter of the outlet nozzle of the outer crucible. This means that $\Delta L$ is preferably at least $D_A/3$, more preferably $D_A/2$ and most preferably at least $2D_A/3$.

Furthermore it has been found that a straight preform can be achieved by choosing a high speed during the drawing process of the preform out of a double crucible. In order to achieve such high speed, a comparatively lower viscosity of the glass is necessary. Thus, the crucible according to the present invention having an extended outlet nozzle of the inner crucible also insures the manufacture of preforms of a high quality.

Polished surfaces of the double crucible and the drawn preform, provide good mechanical stability to the glass fiber preform and reduce back scatter for core light and/or cladding light, when it is surrounded with a coating provided by means of a polished pipe. Also polishing by grinder is conceivable.

The special material, from which the double crucible, primarily its contacting surface with the glass melt, is preferably made, allows it to employ the above-mentioned HMO glass for the glass fiber manufacture.

Preferably the crucible material comprises a platinum/iridium alloy or gold and/or an alloy of gold. Both materials have a comparatively slight reducing action on HMO glass. The use of gold-containing crucible material, especially Pt5Au, in connection with drawing of the glass fiber from HMO glass, preferably a Sb, Te or Bi oxide-containing glass, has the advantage of lower attenuation of the fiber and sufficient mechanical stability of the fiber structure.

The double crucible according to the invention can serve for making preform bodies for glass fiber and also for direct drawing of the finished glass fiber. The term "preform body" or "preform" means a crude or raw glass fiber comprising a core and one or more coatings or cladding, which already has the appearance of finished glass fiber and can be typically drawn further to form the finished glass fiber.

According to a preferred embodiment of the invention the outer crucible is made from an electrically insulating material and the inner crucible is made from an electrically conductive material, so that it can be heated by an electromagnetic field. This embodiment facilitates an especially simple and effective heating of the double crucible.

Then the crucible wall of the inner crucible can be heated with a MF/HF field by means of a simple coil arrangement, which heats contents of the inner crucible on its inside and contents of the outer crucible on its outside.

The insulation material of the outer crucible preferably is a ceramic material, e.g. $Al_2O_3$, $ZrO_2$ or quarzal (a body made of a sintered quartz glass powder) and/or quartz glass. The electric conductivity material of the inner crucible is preferably a platinum/iridium or platinum/gold alloy.

According to an alternative embodiment of the double crucible according to the invention it can be formed so that the outer crucible at least partially comprises an electrically conductive material and the inner crucible similarly comprises an electrically conductive material.

Also in this type of arrangement a simple and effective heating of the inner crucible is possible by means of an MF/HF field. The field also acts in the outer crucible when to a reduced extent eddy currents are produced and thus an additional heating.

In the above-described alternative embodiments different forms of the outer crucible are conceivable, which act so that the MF/HF field penetrates the wall of the outer crucible and predominantly produces eddy currents in the wall of the inner crucible. Thus it is conceivable that a slotted noble metal crucible can form the outer crucible. This embodiment can be designed so that a quartz glass crucible provided with a thin noble metal layer can form the outer crucible.

The double crucible can be formed so that a cooled skull crucible with a palisade of noble metal tubing or pipe forms the outer crucible.

In all of the above alternative embodiments the noble metal is preferably one of the above-described metals and/or metal alloys.

According to an advantageous further form of the above-described embodiments of the double crucible, in which the outer crucible is at least partially made from an electrically conductive material and the inner crucible is similarly made from an electrically conductive material, the outer crucible is provided with a closed jacket of electrically conductive material, to which an MF/HF coil for heating is associated, and the inner crucible is a coaxial double-walled crucible, which is connectable to a current source.

In this further embodiment the outer crucible is heated separately from the inner crucible. The inner crucible can be heated by means of Joule effect by a current flow in both wall parts separately from the outer crucible. Because of that an especially effective adjustment or tuning of the heating of both crucibles in regard to viscosity of the glass is possible.

In this embodiment preferably the intervening space between the conductive inner wall and the conductive outer wall is filled with an insulating material. This material prevents short circuits between the outer and inner walls and thermally separates both glasses.

An additional special advantage of this embodiment is that the heating power for the inner and/or outer wall is variable by using a varying wall thickness. The heating power or heating of the inner and/or outer crucible can be adjusted in a simple manner by a suitable selection of the wall thickness of the conducting inner and/or outer wall. Furthermore the temperature distribution in the inner crucible, which is advantageous for drawing, can be set or adjusted by a suitable choice of different thickness values for the inner wall.

The power, i.e. the current flow from the current source, can be controlled according to a predetermined temperature in the inner crucible. Moreover a temperature sensor can be arranged in the interior space between the conductive interior wall and the conductive outer wall. The output signal from this temperature sensor, which is formed by a thermo-element, acts as an actual value temperature signal for the above-mentioned controller.

In regard to the method of making a glass fiber or preform of the glass fiber, comprising a core and at least one coating or cladding with the double crucible according to the invention, the method according to the invention comprises the steps of:

a) melting a portion of HMO oxide glass for the core glass of the glass fiber and another portion of the HMO oxide glass for the cladding glass in separate gold crucibles from a glass batch in a pre-melting step to form separate glass melts;

b) bubbling oxygen through the glass melts;

c) pre-heating the double crucible and pouring the glass melts into the pre-heated double crucible, with the glass melt of the core glass in the inner crucible of the double crucible and the glass melt of the cladding glass in the outer crucible;

d) holding the glass melts at a predetermined temperature with oxygen bubbling through the glass melts for a predetermined time interval;

e) increasing the temperature and refining of the glass melts, preferably with oxygen passing over them;

f) tempering the glass melts so that the glass melts reach a glass drawing temperature; and g) drawing of the glass fiber or preform from the tempered glass melts.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
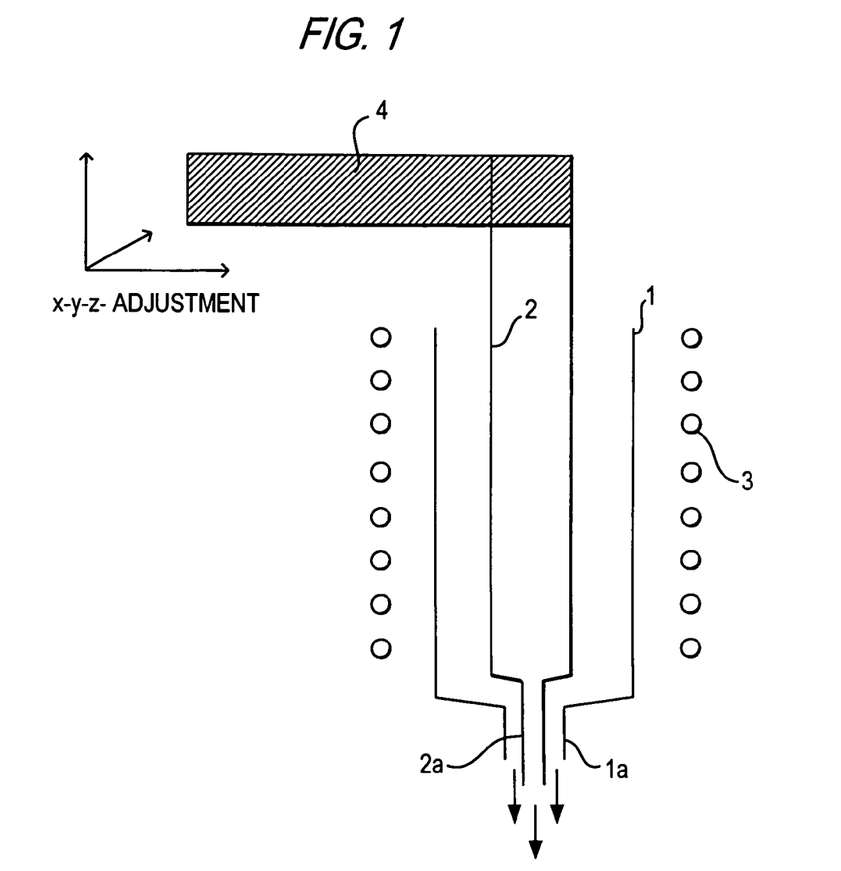
FIG. 1 is a longitudinal cross-sectional view through a first embodiment of a double crucible according to the invention with an outer crucible made of insulating material and an inner crucible made from conductive material, which is heated by an MF/HF field.

FIG. 1 is a longitudinal cross-sectional view through a first embodiment of the double crucible according to the invention with an outer crucible 1 made of an electrically insulating supporting material, for example a ceramic material, such as $Al_2O_3$, $ZrO_3$ or quarzal and/or quartz, and an inner crucible 2, which is made of electrically conductive material, arranged coaxially in the outer crucible 1.

When a glass fiber is drawn in the direction of the arrow the coating or cladding glass is located in the outer crucible and the core glass is located in the inner crucible 2.

A coil arrangement 3 coaxially surrounding the double crucible is provided for heating the inner crucible 2. This coil arrangement 3 is connected to a medium frequency generator so that it produces a medium frequency electromagnetic field, which induces eddy currents in the material of the inner crucible 2. The inner side of the inner crucible and the contents of the outer crucible 1 at the same time as the outer side of the inner crucible are thus heated inductively with this coil arrangement 3. The medium frequency electromagnetic field penetrates the non-conductive material of the outer crucible 2.

According to an alternative embodiment of the double crucible according to FIG. 1, it can be constructed so that the outer crucible is at least partially made from an electrically conductive material. Also in an arrangement of this type a simple and effective heating of the inner crucible by means of an MF/HF electromagnetic field is possible. The field also acts to produce eddy currents to a lesser extent in the outer crucible and thus to provide an additional heating of the outer crucible.

In the above-described alternative embodiment different forms of the outer crucible are conceivable, which should operate so that the MF/HF field penetrates the wall of the outer crucible as much as possible and predominantly produces eddy currents in the wall of the inner crucible. Thus it is conceivable that the outer crucible is formed by a slotted noble metal crucible. The double crucible can be designed so that the outer crucible is provided by a quartz glass crucible with a thinner noble metal layer.

For control of the glass fiber drawing process for drawing the glass fiber with an inner core and an outer coating it is advantageous to be able to adjust the inner crucible in any direction along the X, Y and Z axes as shown in FIG. 1. The block 4 is a diagrammatic representation of the preferred adjusting or positioning mechanism.

Because the inner and outer crucibles are separately heated the glass in the inner crucible 2 can be at a higher temperature and thus a lower viscosity in comparison to the double crucible according to the state of the art, in which only the outer crucible is heated.

Figure 2A:
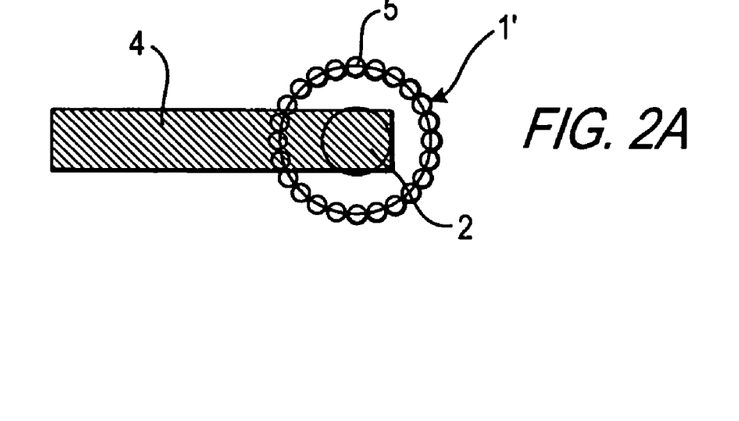
FIGS. 2A and 2B are respective top plan and longitudinal cross-sectional views through a second embodiment of the double crucible, which is variant of the first embodiment shown in FIG. 1, with an outer crucible in the form of a skull crucible.
Figure 2B:
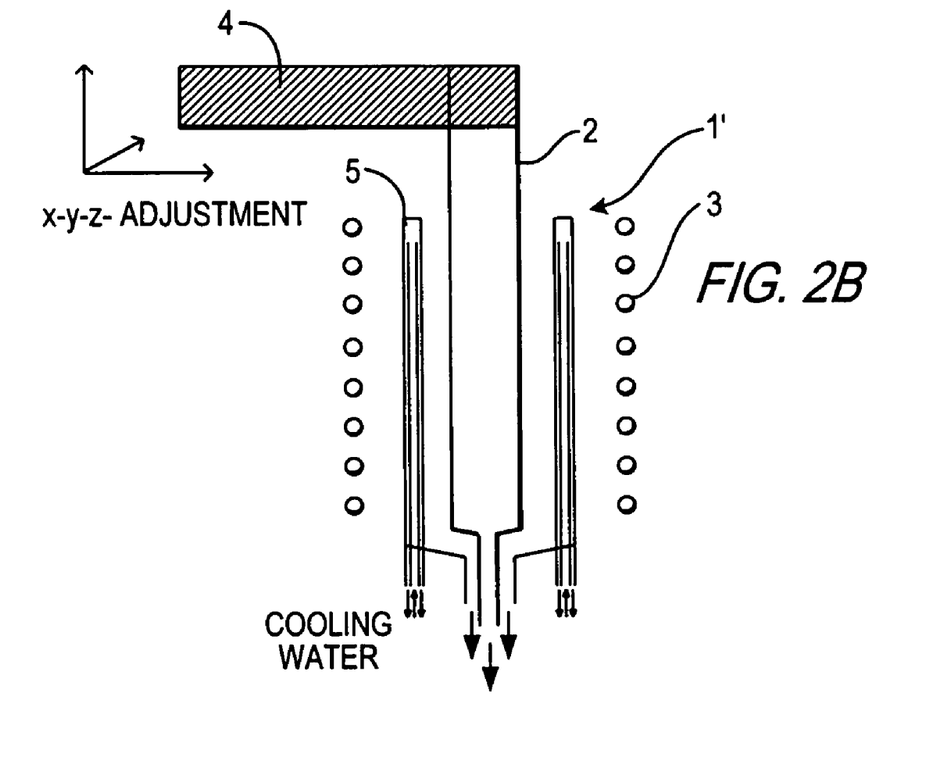

FIGS. 2A and 2B show respective top plan and longitudinal cross-sectional views of another embodiment of the double crucible according to the invention. This embodiment has an outer crucible in the form of a so-called skull crucible 1', which comprises individual water-cooled electrically conductive tubes 5 in the form of a palisade (see FIG. 2A), and an inner crucible 2 made from a conductive material, as in the embodiment shown in FIG. 1. The heating of the inner crucible occurs similarly by means of eddy currents produced by inductive heating of the material of the inner crucible. The required electromagnetic field is produced by the coil arrangement 3, in a manner similar to the embodiment shown in FIG. 1, and penetrates the tubular palisade of the outer crucible 1. The heated inner wall simultaneously heats the contents of the outer crucible.

Figure 3:
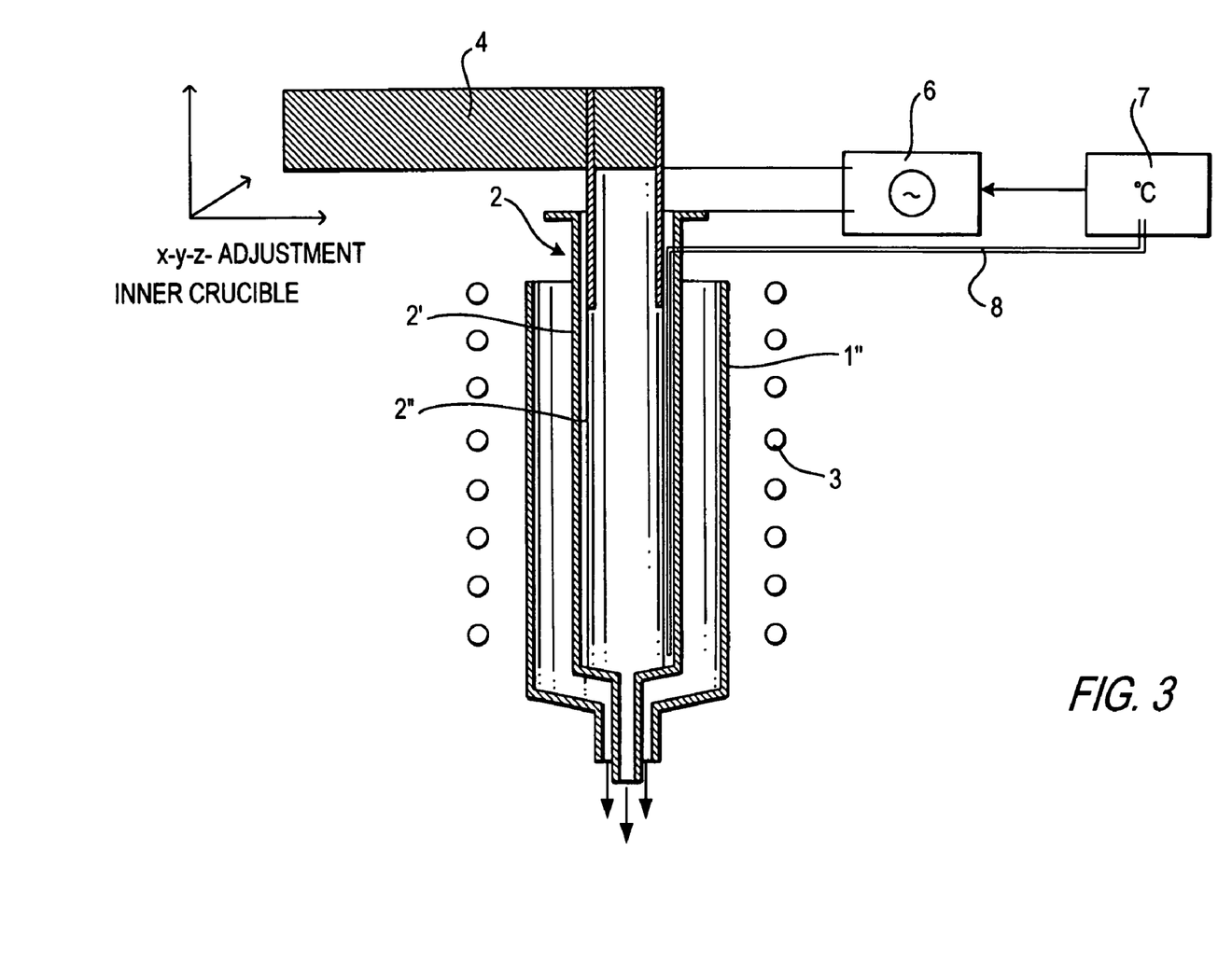
FIG. 3 is a longitudinal cross-sectional view through a third embodiment of a double crucible according to the invention with an outer crucible made of conductive material, which is heated by means of an MF/HF electromagnetic field, and a double-walled, conductive inner crucible, which is heated by means of a direct electrical current.
Figure 4:
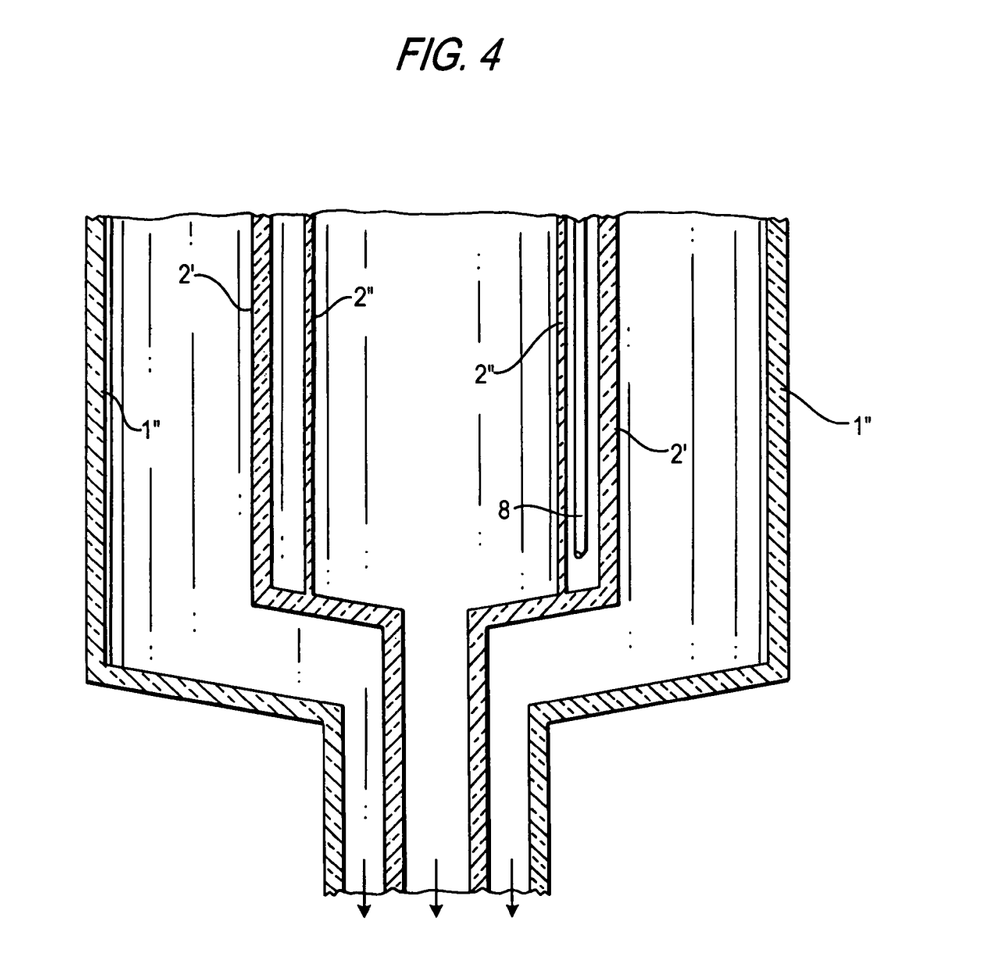
FIG. 4 is a detailed cutaway longitudinal cross-sectional view of a bottom portion of the double crucible shown in FIG. 3.

FIG. 3 shows a third preferred embodiment of the double crucible according to the invention and FIG. 4 is an enlarged or detailed view of a lower portion of this double crucible. This embodiment has an outer crucible 1" made from a conductive material and an inner crucible 2 made from conductive material. The inner crucible 2 comprises a conductive interior wall or conductor 2" and a conductive exterior wall or conductor 2', which are arranged coaxial to each other as well as a current source 6. The heating of the inner crucible 2 occurs thus by direct current flow. The medium frequency coil 3, which produces eddy currents in the conductive material of the outer crucible, heats the outer crucible 1".

A temperature controller 7 is provided for controlling the temperature of the inner crucible 2. The temperature controller 7 receives on its input side a temperature actual value signal from a thermoelement 8. The thermoelement is arranged in an interior space between the conductive interior and exterior walls 2', 2", which is filled with non-conducting material. The output side of the temperature controller 7 is connected to the current source 6.

The heating power in the inner crucible and also the outer crucible may be adjusted by suitable selection of wall thickness values for the conductive interior and exterior walls 2', 2".

All embodiments have the common feature that the outlet nozzle of the inner crucible projects beyond the outlet nozzle of the outside crucible. Because of that glass with a steeper viscosity curve can be stabilized during drawing of glass.

Furthermore all embodiments have the common feature that the surfaces of the nozzles of the double crucible, which come in contact with the glass melt are polished. This provides a very good roundness for the core and the coating or cladding. This is important for attaining small polarization mode dispersion and good coupling in the glass fiber. The polished surfaces of the double crucible also lead to good mechanical stability for the drawn glass fiber and reduced back scatter of the core light and/or of light of the first cladding, when it is surrounded with a second cladding by means of an interior polished tube (not shown).

The double crucible according to the invention preferably is used for drawing of glass fiber from heavy metal oxide glass, so-called HMO glass (heavy metal oxide). Bismuth oxide-containing glass is also an HMO glass. This glass is characterized by definite broad-band emission of rare earth ions, which leads to higher transmission, in contrast of $SiO_2$-containing glass.

On the other hand, e.g. the bismuth oxide-containing glass has the disadvantage that other ingredients can reduce bismuth oxide under drastic conditions in the glass melt. The resulting elemental bismuth may disadvantageously impair optical properties, especially the transparency, of the glass.

The material of the crucible has a special importance, if HMO glass is drawn into fiber.

Since platinum has an undesirable interaction with e.g. a bismuth oxide-containing glass, it is advantageous to use a gold crucible instead of a platinum crucible at comparatively lower melt temperatures of at most 1000° C. However since gold softens at this temperature because of its closeness to its melting point and platinum is still comparatively stable, a gold-coated platinum crucible can be used. Because of that direct contact of the melt with the platinum is avoided. At the same time the under-lying platinum layer mechanically supports the gold coating. This gold coating for example can be provided by rolling a gold foil on the platinum, electro-chemical deposition or other state of the art methods. Furthermore surprisingly Pt/Au alloys, in which, for example, from 5 percent by weight, preferably 10 percent by weight, gold in platinum, reduce or even entirely prevent corrosion of the crucible material, are suitable as the resistant crucible material. For example, a crucible with an Au/Pt ratio of 95/5 contains only a small amount of platinum, however it is usable up to 1200° C. Also a Pt/Ir alloy has proven to be an advantageous crucible material.

It has been shown that a glass fiber having low attenuation and sufficient mechanical stability is produced using Pt5Au alloy as crucible material.

The method of making glass fibers with the double crucible shown in FIG. 1 is described in more detail now with the following four examples.

EXAMPLES

Example 1

The outer crucible 1 has a height of 250 mm and a diameter of 150 mm, the nozzle 1a of the outer crucible 1 has a length of 45 mm and a diameter of 30 mm. The inner crucible 2 has a height of 500 mm and a diameter of 40 mm and is attached so that its nozzle 2a projects about 15 mm from the nozzle 1a of the outer crucible 1. The nozzle 2a has a length of 60 mm and a diameter of 4 mm. Both crucibles are made from Pt/Ir or Pt5Au.

In a separate melting step about 4 l of Bi-oxide coating glass are melted in a gold crucible at about 950° C. and ½ l of a similar Bi-oxide core glass are melted in a gold crucible from the glass batch. The glass melts are intensively bubbled with dry oxygen, in order to prevent reduction of the bismuth. Additionally the bubbling prevents separation of the light and heavy glass batch ingredients and provides thorough mixing. Further a gold stirrer can be used.

Figure 5:
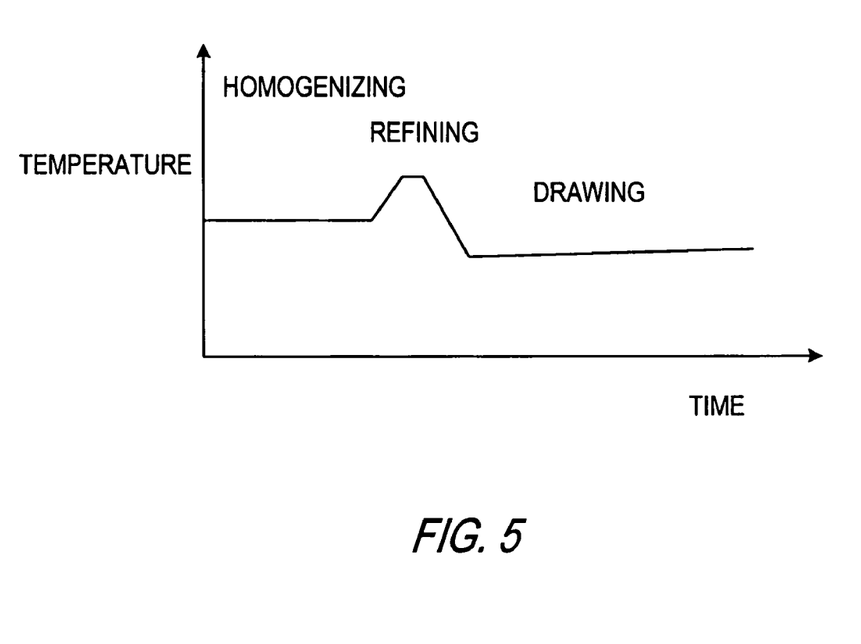
FIG. 5 is a graphical illustration of the time variation of temperature in the double crucible during a glass drawing process.

The melts are poured into the double crucible pre-heated by coupling in of MF electromagnetic energy and kept there at a temperature of about 650° C. with oxygen bubbling through them for several hours. Now, as shown in FIG. 5, the temperature rises to 820° C. and is refined with excess input oxygen after about ½ hour. Tempering to drawing temperature of about 520° C. occurs following the refining, as shown in FIG. 5.

Then the drawing of the preform begins. The exact constant temperature has a special significance here because of the steep viscosity curve. Temperature fluctuations of several degrees C have a noticeable effect on the geometry of the drawn preform.

The centering of the core and the core/cladding ratio may be adjusted by positioning the inner crucible. Core/cladding ratios of 1:10 at an outer diameter of 1.2 mm result with the above-described geometry.

In a separate step cladding tubes of Bi-oxide glass for the preform made in the double crucible according to the draw-down methods are drawn from the 4 l discharge crucible. The necessary glass is similarly melted in a separate step in a gold crucible and poured into the drawing crucible. Pipes with polished surfaces are made with an outer diameter of 6 mm and a wall thickness of 2.2 mm, so that a fiber with the following dimensions results: core: 3 µm; cladding: 30 µm with a fiber outer diameter of 125 µm.

Example 2

The same as in example 1 but good dissolving of the ingredients in the $Bi_2O_3$ matrix is achieved. Because of that the melting temperature and thus the formation of elemental bismuth is reduced.

Example 3

The same as in example 1 but the raw materials are mixed in a suitable composition and burned in a first step at 600° C. so that a pre-reaction occurs. Because of that the melting temperature and the formation of elemental bismuth is reduced.

Example 4

The same as in example 1 but with the following control: Measurement of the diameter of the core/cladding preform and control of the drawing speed with a short time constant with a limit of 6 cm/min, however control of the crucible temperature with longer time constant.

The disclosure in German Patent Application 102 29 942.0-45 of Jul. 4, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a double crucible for glass drawing methods and a process for making glass fibers and associated preforms with the double crucible, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A double crucible for drawing a core-clad glass fiber, said core-clad glass fiber comprising a glass core with at least one glass cladding, said double crucible comprising
   a heatable outer crucible for holding a cladding glass melt;
   an inner crucible surrounded by the outer crucible, said inner crucible being heatable separately from the outer crucible in order to hold a core glass melt; and
   wherein the outer crucible has an outlet nozzle, the inner crucible has an outlet nozzle, the outlet nozzle at the inner crucible projects or extends beyond the outlet nozzle of the outer crucible;
   so that the core-clad glass fiber can be drawn from the core glass melt in the inner crucible and the cladding glass melt in the outer crucible.

2. The double crucible as defined in claim 1, wherein said inner crucible and said outer crucible comprise a platinum/iridium alloy.

3. The double crucible as defined in claim 1, further comprising gold or a gold alloy and wherein surfaces of said inner crucible and said outer crucible contacting a glass melt are provided on said gold or gold alloy.

4. The double crucible as defined in claim 3, wherein said gold alloy is a platinum/gold alloy with about a 5 percent by weight gold content.

5. A double crucible for a glass drawing process, said double crucible comprising
   a heatable outer crucible;
   an inner crucible surrounded by the outer crucible, said inner crucible being heatable separately from the outer crucible; and
   wherein the outer crucible has an outlet nozzle, the inner crucible has an outlet nozzle, the outlet nozzle of the inner crucible protects or extends beyond the outlet nozzle of the outer crucible;
   wherein said outer crucible comprises an electrically insulating material and the inner crucible comprises an electrically conductive material heatable by an electromagnetic field.

6. The double crucible as defined in claim 5, wherein said electrically insulating material is a ceramic material.

7. The double crucible as defined in claim 1, wherein said outer crucible (1',1") comprises an at least partially electrically conductive material and the inner crucible (2) comprises an electrically conductive material.

8. The double crucible as defined in claim 7, wherein said outer crucible is formed by a slotted metal crucible.

9. The double crucible as defined in claim 7, wherein said outer crucible is a quartz glass crucible with a metal layer thereon.

10. The double crucible as defined in claim 7, wherein said outer crucible is a cooled skull crucible (1') with a palisade of metallic tubing.

11. A double crucible for a glass drawing process, said double crucible comprising
    a heatable outer crucible;
    an inner crucible surrounded by the outer crucible, said inner crucible being heatable separately from the outer crucible; and
    wherein the outer crucible has an outlet nozzle, the inner crucible has an outlet nozzle, the outlet nozzle of the inner crucible projects or extends beyond the outlet nozzle of the outer crucible;
    wherein said outer crucible (1',1") comprises an at least partially electrically conductive material and the inner crucible (2) comprises an electrically conductive material;
    wherein said outer crucible has a closed jacket made from an electrically conductive material, to which an MF/HF coil is associated for heating, and said inner crucible is a double-walled crucible that is connectable to a current source, so that a current may be passed through said double-walled crucible for heating.

12. The double crucible as defined in claim 11, wherein the double-walled crucible has a conductive interior wall (2") and a conductive exterior wall (2') with insulating material filling an intervening space between said conductive interior wall (2") and said conductive exterior wall (2').

13. The double crucible as defined in claim 12, wherein said interior wall and said exterior wall have respective different wall thickness values in different regions for controlling heating in said different regions.

14. The double crucible as defined in claim 12, further comprising a temperature sensor arranged in said intervening space between said interior wall and said exterior wall.

15. The double crucible as defined in claim 1, wherein the outlet nozzle of the outer crucible has a diameter ($D_A$) and the outlet nozzle of the inner crucible extends beyond the outlet nozzle of the outer crucible by a length ($\Delta L$) that is equal to at least one third of the diameter of the outlet nozzle of the outer crucible.

* * * * *